United States Patent
Fedor et al.

(10) Patent No.: US 8,886,186 B2
(45) Date of Patent: Nov. 11, 2014

(54) VERIFICATION OF COMPATIBILITY AMONG TELECOMMUNICATION NETWORK FEATURES

(75) Inventors: Szymon Fedor, Athlone (IE); Liam Fallon, Athlone (IE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 205 days.

(21) Appl. No.: 13/574,700

(22) PCT Filed: Jan. 22, 2010

(86) PCT No.: PCT/EP2010/050716
§ 371 (c)(1),
(2), (4) Date: Nov. 28, 2012

(87) PCT Pub. No.: WO2011/088898
PCT Pub. Date: Jul. 28, 2011

(65) Prior Publication Data
US 2013/0196658 A1    Aug. 1, 2013

(51) Int. Cl.
*H04W 88/02* (2009.01)
*G06F 9/44* (2006.01)
*H04W 8/22* (2009.01)

(52) U.S. Cl.
CPC . *H04W 8/22* (2013.01); *G06F 8/35* (2013.01); *G06F 8/10* (2013.01)
USPC ....................................................... 455/434

(58) Field of Classification Search
USPC .................. 455/434; 717/104, 113, 140, 752; 707/606, 694, 802; 709/223; 715/771
See application file for complete search history.

(56) References Cited

U.S. PATENT DOCUMENTS

| | | |
|---|---|---|
| 6,639,980 B1 | 10/2003 | Weiss et al. |
| 6,898,768 B1 | 5/2005 | Theodossy et al. |
| 7,490,153 B1 | 2/2009 | Krishnan et al. |
| 2008/0244519 A1 | 10/2008 | Sciacqua et al. |

(Continued)

FOREIGN PATENT DOCUMENTS

| | | |
|---|---|---|
| EP | 0 947 085 | 9/2004 |
| EP | 1 916 596 | 4/2008 |

OTHER PUBLICATIONS

International Search Report for PCT/EP2010/050716, mailed Aug. 16, 2010.

(Continued)

*Primary Examiner* — Diane Mizrahi
(74) *Attorney, Agent, or Firm* — Baker Botts, LLP

(57) ABSTRACT

A method and apparatus for assessing the compatibility of a selected network feature with the network features of an existing telecommunications network 10 comprises providing an abstraction of each network feature in the form of a data model 100 which defines the relationships between any network elements 12 or nodes 27, software elements 13 and software features 14 required for each network feature. Information 19 is then collected about the existing telecommunications network 10 to identity the deployment of the network features in the existing network. This information is then combined with the data model 100 to build a feature compatibility matrix 107 which defines the compatibility of network features in the existing telecommunications network 10. The matrix 107 can then be interrogated with information defining the parameters of the selected feature to be added or upgraded to determine whether the selected feature is compatible with features of the existing network.

18 Claims, 7 Drawing Sheets

(56) References Cited

U.S. PATENT DOCUMENTS

| | | |
|---|---|---|
| 2009/0128319 A1 | 5/2009 | Dholakia et al. |
| 2009/0144364 A1 | 6/2009 | Krishnan et al. |
| 2009/0307743 A1* | 12/2009 | Azagury et al. .................. 726/1 |
| 2012/0284243 A1* | 11/2012 | Azagury et al. ............. 707/694 |
| 2012/0284389 A1* | 11/2012 | Azagury et al. ............. 709/223 |

OTHER PUBLICATIONS

"Discrete and Combinatorial Mathematics; An Applied Introduction" Fifth Edition by Ralph P. Grimaldi (Rose-Hulman Institute of Technology), 2004.

"Common Information Model (CIM) Infrastructure" DMTF Standard; Version 2.5.0; Document No. DSP0004, 2009.

"UML Profile for CIM" DMTF Standard; Version 1.0.0; Document No. DSP0219, 2009.

"CIM Compliance Specification" DMTF; Version 1.1 Final; Document No. DSP0105, 2003.

OASIS "Solution Deployment Descriptor Specification 1.0" OASIS Standard, Sep. 1, 2008.

"Service Modeling Language, Version 1.1" W3C Recommendation, May 12, 2009.

"3rd Generation Partnership Project; Technical Specification Group Services and System Aspects; Telecommunication management; Configuration Management (CM); Core network resources Integration Reference Point (IRP); Requirements (Release 9)" V9.0.0.

"Object Constraint Language" OMG Available Specification; V 2.0; formal May 1, 2006.

* cited by examiner

VERIFICATION OF COMPATIBILITY AMONG TELECOMMUNICATION NETWORK FEATURES

This application is the U.S. national phase of International Application No. PCT/EP2010/050716, filed 22 Jan. 2010, which designated the U.S., the entire content of which is hereby incorporated by reference.

TECHNICAL FIELD

The invention relates to the verification of compatibility among telecommunication network features.

BACKGROUND

Telecommunication networks, and the features offered on those networks, are becoming larger and more complex. It is commonplace to see network features implemented in many network elements or so-called nodes, which are often located in different network domains. For example, the "SGSN in Pool" feature is implemented in Serving General Packet Radio Service (GPRS) Support Nodes (SGSNs) in the mobile core network and in Radio Network Controllers (RNCs) and Base Station Controller (BSCs) in Radio Access Networks.

Features in networks are increasingly implemented in software. The concept of software defined radio heralds an era where all radio and digital signalling processing is defined using software. Software embedded in network elements uses enabling technology such as web services and peer to peer techniques to implement advanced Self-Organizing Network (SON) features such as Automatic Neighbour Relations (ANR).

At present, the software for most network elements is bundled into a single load module. All of the software programs needed to implement the features supported by a network element (which may include part of network features) are packaged into this single load module. Ensuring that all network features are compatible across all nodes that implement a feature is handled as an off-line administrative activity.

A complex system is characterised by a plurality of interdependent components. Several methods can be applied to represent these dependencies. One of the most common way is to use directed graphs, which are composed of a set of vertices or nodes and a set of ordered pairs of vertices called arcs, directed edges or arrows. Paths then represent dependencies between components. Knowing that there is a path from node a to node b indicates that a is dependent on b, since a is affected if b changes. Such directed graphs may be represented in different ways, such as matrices, lists and nodes with pointers to their children and parents.

Another method of representing a complex system and its dependencies is by using Unified Modelling Language (UML) models. With the UML class diagram a system can be abstracted and various types of dependencies between the components of a system can be modelled. The advantage of UML over directed graph relies in the possibility of a more enriched representation of various aspects of the system, e.g. requirement for the dependency.

Semantic networks can also be used to represent dependencies in complex systems. A semantic network is a node and edge-labelled directed graph and therefore can be used to represent systems at more detailed granularity level. Semantic networks function to model semantic relations between the concepts and can be used either to represent knowledge or to support automated systems for reasoning about knowledge. Semantic Web technology can be used to represent semantic networks in a machine-readable way.

There exist several network model standards that could be used to assess feature compatibility among products from different vendors.

Firstly, the Common Information Model (CIM) is an open standard defined by Distributed Management Task Force (DMTF) and it describes managed entities, their composition and relationships. The management models are comprised of a Core Model and a set of Common Models (defined for systems, services, networks, applications, users, and databases) that extend from the Core.

Secondly, the Solution Deployment Descriptor (SDD) is a standard in the form of schema for XML documents, developed by the Organization for the Advancement of Structured Information Standards (OASIS) and defining a standardized way to express software installation characteristics required for lifecycle management in a multi-platform environment. The SDD defines schema for two Extensible Mark-up Language (XML) document types: (i) Package Descriptors and (ii) Deployment Descriptors. The package descriptor defines package content which includes artefacts whose processing results in deployment of the software package. The deployment descriptor defines metadata associated with those artefacts.

Thirdly, the Service Model Language (SML) is an XML schema specification used to model complex IT services and systems, including their structure, constraints, policies, and best practices. An SML model is a set of interrelated XML documents. An SML model could contain information about the parts of an IT service, as well as the constraints that each part must satisfy for the IT service to function properly.

Finally, the Network Resource Model (NRM) is defined by 3GPP and represents the actual managed telecommunications network resources that a System is providing through the subject Integration Reference Point (which is an architectural concept that is described by a set of specifications for definition of a certain aspect of a management interface, comprising a Requirements specification, an Information Service specification, and one or more Solution Set specifications). An NRM describes Managed Object Classes (MOCs), their associations, attributes and operations.

For most telecommunications nodes, software is deployed and installed as a single container that contains all of the software units for all features on that network element or node. The software for individual features is generally not installed separately on network elements. Any particular feature may be supported by a number of network elements.

This approach to software deployment is problematical because, as the number of network features increases, it becomes increasingly difficult to keep the software on each network element or node matched and verified with the software on other network elements or nodes around it.

Another problem is that there is no way of knowing which features are installed in the network because the software for a feature is deployed piecemeal on a node-by-node basis. Therefore, network operations staff cannot definitively say which features are installed on the network and if the software implementing those features is consistent and verified across the nodes that implement that feature.

We have now devised a method and apparatus for assessing the compatibility of a selected network feature with the network features of an existing telecommunications network, which alleviates the above-mentioned problems.

SUMMARY

In accordance with the present invention, as seen from a first aspect, there is provided a method of assessing the compatibility of a selected feature in a network element or elements with the network features of an existing telecommunications network. The method comprises providing an abstraction of each network feature in the form of a data model, defining the relationships between these network features and network elements or nodes, software elements and software features required for each network feature. Information is then collected about the existing telecommunications network to identify the deployment of the network features in the existing network. This information is then combined with the data model to build a feature compatibility matrix which defines the compatibility of network features in the existing telecommunications network. The matrix can then be interrogated with information defining the parameters of the selected feature to be added or upgraded to determine whether the selected feature is compatible with features of the existing network.

This invention thus proposes a model of network components (network elements, software elements, software features), their dependencies and constrains. This model can be explored for an automatic end-to-end assessment of compatibility between network features in a telecommunications network.

The method enables fast, easy and accurate decision making regarding the planning of new features deployment or the upgrade of already existing features.

The present invention is a part of a two-phase process. In the first step a model prepared by an expert of a network feature (including its requirements and dependencies on other features and software units) is read by the system.

The model is created using two parts. The first component is a meta-model (e.g. in UML) that represents general network components such as network elements or software elements, their properties (e.g. release) and relationships (e.g. Installed On). The second component comprises constraints, for example provided in the Object Constraint Language (OCL) that apply to a specific feature: This can express the compatibility between software and network release or required type of network elements in a feature.

The model can be reused over and over again for assessment of the feature compatibility for different network instances. When a representation of the network resources is instantiated in a network, it includes information about deployed (or projected) network elements, connections between them and software elements. This information is either collected from the elements (i.e. nodes) of the network or from the network operations system software (OSS) and combined with the model of the network features previously built. As a result a compatibility matrix is compiled, which contains information about the existing (or projected) features and their dependencies in the considered network instance. The method of the present invention thus explores the compatibility matrix in order to assess whether all of the requirements provided in the network features models have been fulfilled for the selected feature. If the assessment is successful, the user can deploy the projected features into the instantiated representation of the network verified with the method.

The method can determine whether a solution can be created if the selected feature is incompatible with the features of the existing network. In the event that a solution can be created, the method could propose modifications to the network resources in order to fulfil feature requirements and create a solution, for example by providing or requesting a suitable software code to update the network. Once the network is updated, the method of the present invention can again explore the compatibility matrix in order to assess whether all of the requirements provided in the updated network features have been fulfilled for the selected feature.

In the event that a solution cannot be created, the method comprises creating a list of the or each incompatibility.

Following modelling, a software application may be generated for execution by a user who wants to check feature compatibility in a network instantiation. This application provides a simple interface between the user and the matrix, thereby facilitating the task of determining whether a selected feature is compatible with the existing network features.

The method of the present invention can also enable compatibility assessment of features deployed over multiple network domains. Every network domain has a local system to assess its feature compatibility. Every such system can control compatibility assessment of a feature (in such scenario system is called master) or respond to request from the master system (in this scenario the system is called slave).

In accordance with the present invention, as seen from a second aspect, there is provided an apparatus for assessing the compatibility of a selected network feature with the network features of an existing telecommunications network. The apparatus comprises a memory containing a feature compatibility matrix created from a model of each network feature and from information about said existing telecommunications network to identify the deployment of the features in the existing network. The models define the relationships between any network elements, software elements and software features required for each network feature. An input is provided for receiving information from a user which defines the parameters of the selected feature. A processor then interrogates the matrix with the information from the input, which defines the parameters of the selected feature, and determines from the matrix whether the selected feature is compatible with features of the existing network.

The processor generates an instantiation of each network feature and builds the feature compatibility matrix using the model of each network feature and the information obtained about the existing telecommunications network.

The processor may be arranged to execute a software code to interrogate the matrix.

The processor is arranged to generate an instantiation of each network feature and to build a revised feature compatibility matrix whenever it is detected that a network feature is updated or varied.

In one embodiment, the information identifying the deployment of the features in the existing network may be provided from OSS on the existing network: the OSS may retain information in its databases about the topology of the network and other useful information. In an alternative embodiment, the apparatus comprises a communication interface, the information identifying the deployment of the features in the existing network being provided from one or more elements of the network via the interface.

The first embodiment has the benefit that the invention may be implemented as an extension to the OSS and hence the process of obtaining the necessary information would not create additional traffic.

The second embodiment could be beneficial in networks with a distributed OSS. In this case, the apparatus can be implemented in a device separate to the network, the device being a free-standing box or a card.

BRIEF DESCRIPTION OF THE DRAWINGS

An embodiment of the present invention will now be described by way of example only and with reference to the accompanying drawings, in which.

DETAILED DESCRIPTION

Figure 1:
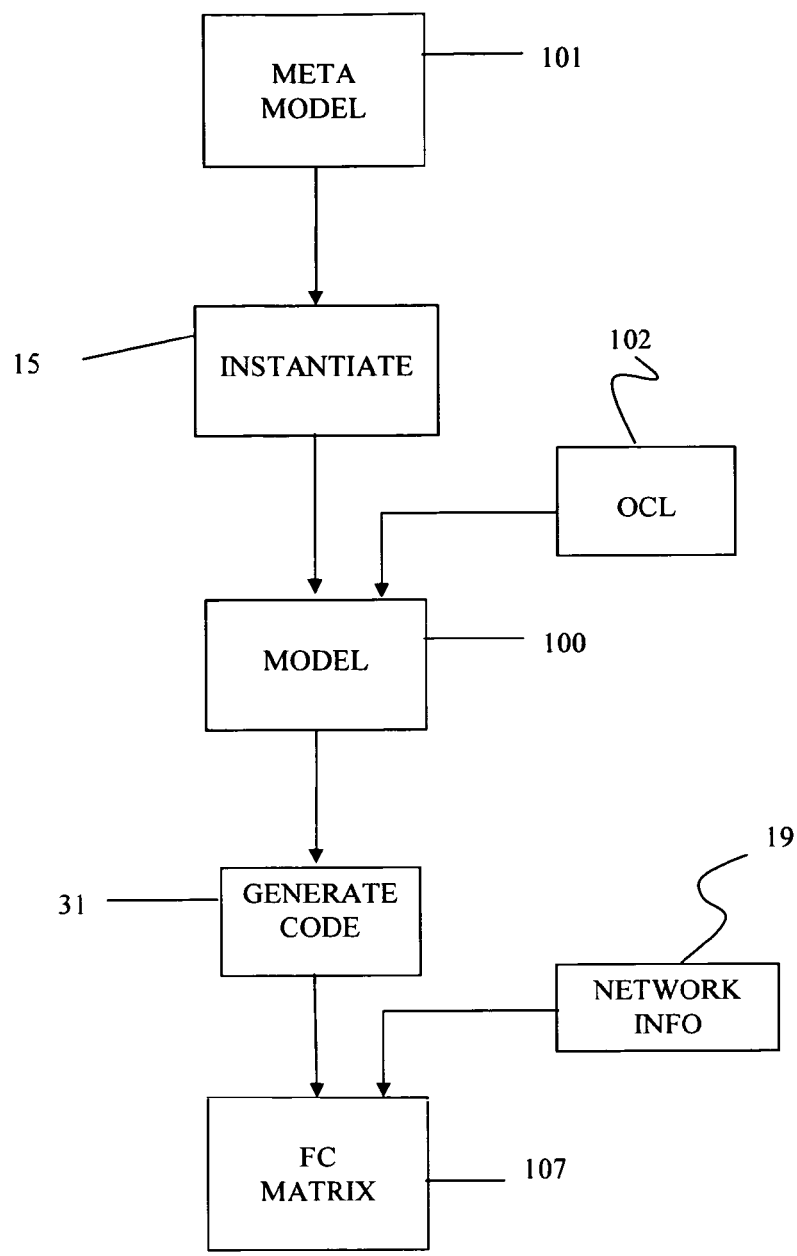
FIG. 1 is a block diagram of elements of the present invention.

Referring to FIG. 1 of the drawings, the invention comprises a model 100 which allows an automatic verification of end-to-end compatibility among network features.

The model 100 enables the common representation of features and their dependencies in a Telecommunications network (e.g. Network B). This information can be then used to verify end-to-end compatibility among network features. The proposed model is composed of a meta-model designed using UML 101 and OCL constraints 102.

Figure 2:
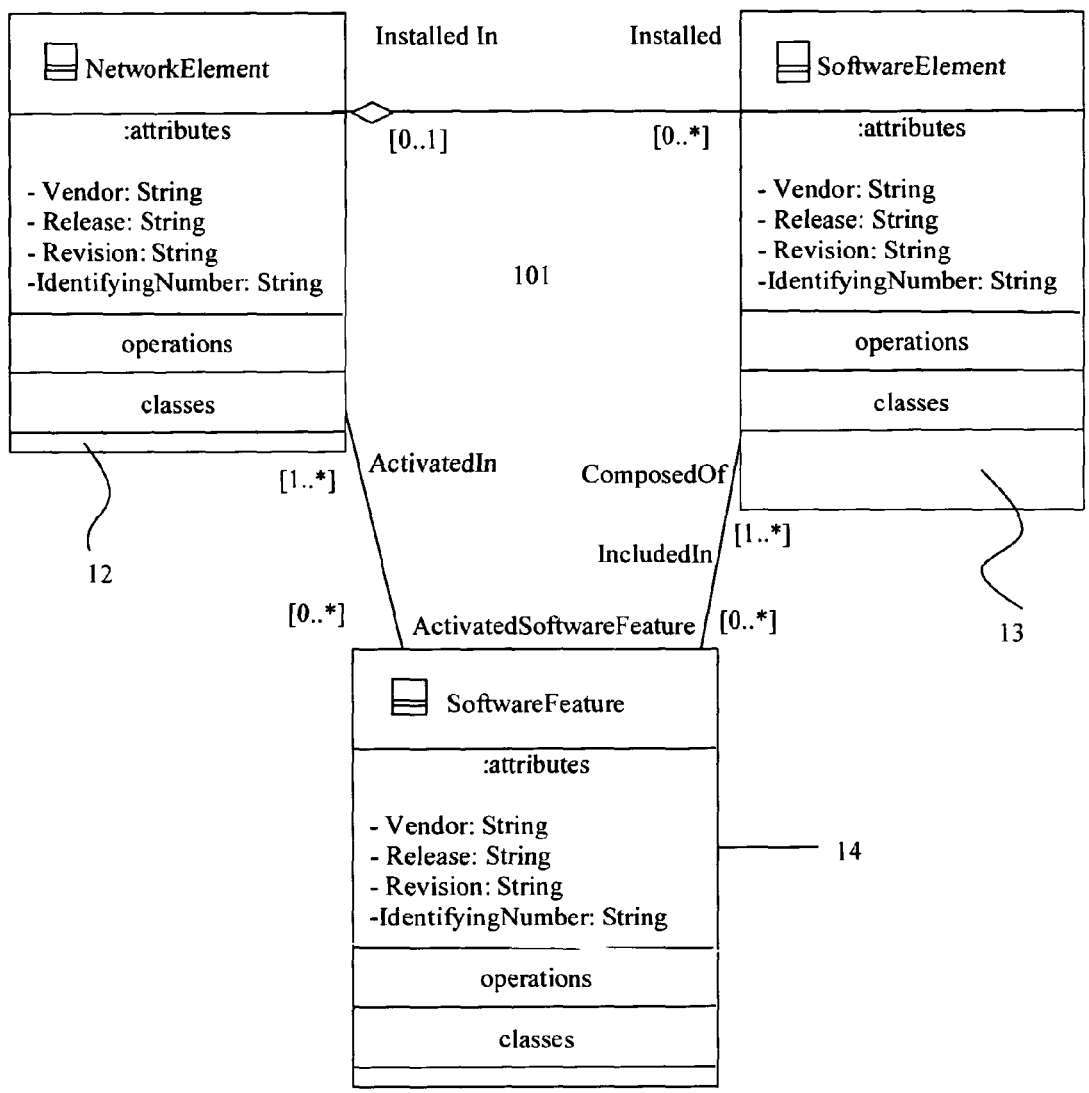
FIG. 2 is a diagram of a meta-model used in the present invention.

Referring to FIG. 2 of the drawings, there is shown an meta-model designed using UML 101 that represents elements or nodes that have an impact on the feature compatibility in an existing telecommunications network. The classes have the following meaning in the drawing:

NetworkElement class 12 corresponds to a logical entity in telecommunications network (e.g. SGSN or RNC).

SoftwareElement class 13 represents a software package that provides specific functionality on a network element. This could be for example IP connectivity or Support for SGSN In Pool on RNC. The SoftwareElements 14 can be installed on the aforementioned NetworkElements 12, the installation being expressed by the relationship the statement Installed/InstalledIn.

SoftwareFeature class 14 models network functionality, usually deployed over several nodes. This could be for example SGSNInPoolForWCDMA, which involves interaction between several SGSNs, RNCs and eventually an OSS. This interaction is modelled by the ActivatedSoftwareFeature/ActivatedIn relationship. Also, SoftwareFeature is implemented in several SoftwareElements 13 and this is represented by the relationship ComposedOf/IncludedIn.

These classes have similar properties used for the assessment of feature compatibilities. A vendor of the network element provides the information about the provider of the corresponding class to a user who then writes the meta model 101. This information will be explored in particular for the multiple-domain networks. The Release and Revision terms in the meta model 101 are used to distinguish different versions of modelled entity. These parameters are important for the assessment of compatibility because the compatibility between different types of nodes is version-based. Finally the purpose of the IdentifyingNumber in each class of the meta model 101 is to uniquely identify the modelled entity.

Figure 3:
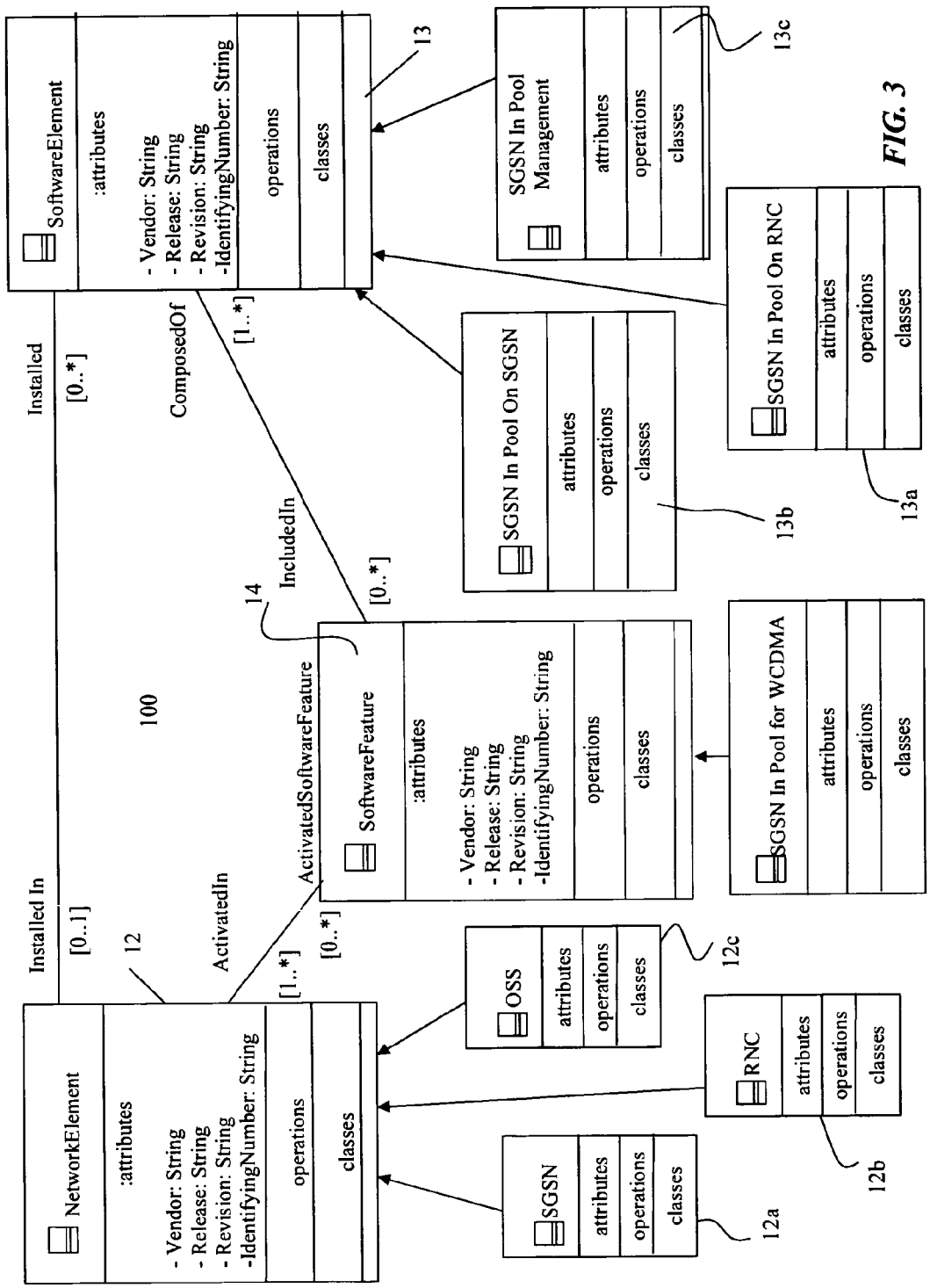
FIG. 3 is a diagram of an instantiated data model created from the meta-model of FIG. 2 using information from the telecommunications network.

The meta-model 101 can then be extended to represent specific network features, network and software elements on the existing network. An example of a model 100 that can be used to assess the compatibility of the SGSN In Pool feature is shown in FIG. 3 of the drawings. The above model 100 has to be decorated with OCL constraints 102 which describe feature-specific requirements.

The Object Constraint Language (OCL) is a commonly used declarative language for describing constraints (rules) that apply to UML. These constraints are the conditions that must be true about some aspect of the system and can be automatically verified on an instantiation of the UML model 100.

The network feature can have different constraints that are grouped in three categories:

1. Generic requirements for the network feature. These constraints are specific to the network feature. It may be a requirement about existence of other features, software elements or network elements. In case of SGSN In Pool it is the requirement about SGSN nodes included in the feature.
2. Requirements about software elements and their version needed on the network elements. In order to support a feature the network elements require specific software elements. In case of SGSN In Pool an RNC node requires specific version of software element that supports SGSN In Pool functionality.
3. Constraints about the compatible version of nodes that are present in the software feature. For the SGSN In Pool scenario it may be a condition that SGSN Release "X" Revision "x" is compatible with RNC Release "Y" revision "y".

Once the OCL constraints 102 are created, they can be validated against various instantiations of the UML model 100. The validation process consists of the traversing of the feature model and applying the OCL constraints 102 to the appropriate entities. This process could be performed according to the method described hereinafter with reference to FIG. 6 of the drawings.

The model 100 shown in FIG. 3 is a model of the SGSN Pool for WCDMA feature, which is a feature that makes it possible to connect one RNC to several SGSNs. It requires interaction between SGSNs, RNCs and OSS nodes. The model extends the meta-model 101 with several classes representing entities e.g. 12a-c, 13a-c that participate in the SGSN In Pool feature. This model 100 can be instantiated to express relationships between feature components and their properties in a specific network configuration.

The model 100 must be decorated with constraints such as OCL 102 in order to validate the requirements for the SGSN In Pool feature deployed in a network. The following are some examples of the constraints that are associated with previously mentioned categories:

---

Generic constraints
  Requirement about at least one SGSN
  supporting the SGSN In Pool
context SGSNInPoolForWCDMA inv:
  self.ActivatedIn -> exists(ne : NetworkElement |
  ne.ocIIsTypeOf(SGSN))
    SGSN In Pool Release X Revision x requires
    SGSNs Release Y Revision y
context SGSNInPoolForWCDMA inv:
  (self.Release="X" and self.Revision="x") implies
  self.ActivatedIn -> forAll(ne : NetworkElement | if
  ne.ocIIsTypeOf(SGSN) then (ne.Release="Y" and
  ne.Revision="y") else true endif)
    Constraints about the software element version
    required on network elements
      SGSNs Release X Revision x require
      SGSNInPoolOnSGSN Release Y Revision y
      software element -continued

```
context SGSN inv:
    (self.Release="X" and self.Revision="x") implies
    self.Installed -> forAll(se: SoftwareElement | if
    se.oclIsTypeOf(SGSNInPoolOnSGSN) then
    (se.Release="Y" and se.Revision="y") else true endif)
        Constraints about compatibility between different
        type of nodes
            SGSN Release X Revision x is compatible
            with RNC Release Y Revision y
context SGSM inv:
    (self.Release="X" and self.Revision="x") implies
    selfActivateSoftwareFeature.ActivatedIn -> forAll(ne :
    NetworkElement | if ne. oclIsTypeOf(RNC) then
    (ne.Release="Y" and ne.Revision="y") else true endif)
```

The method of the present invention allows an automatic verification of end-to-end compatibility among network features. It is fully automated and runs in the existing network. The method collects the information about network components, their connections and installed software, and uses this to assess compatibilities in the network for proposed features.

Figure 4:
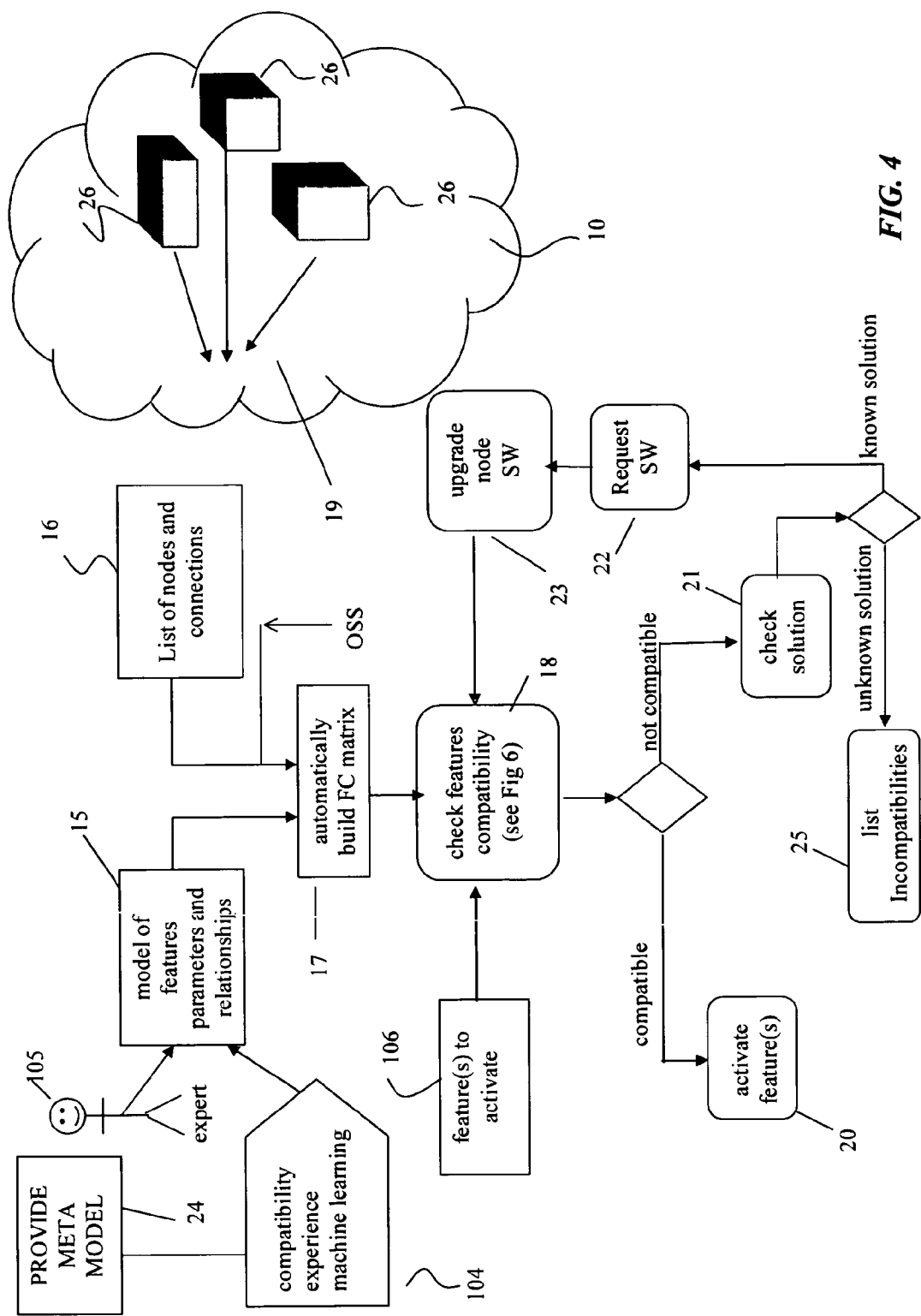
FIG. 4 is a flow diagram illustrating the method of the present invention.

Referring to FIG. 4 of the drawings, there is shown an overview of a system, in which the method of the present invention is operating. The described scenario corresponds to a situation when a network operator would like to deploy a new feature or upgrade an existing feature on a single network domain.

The method comprises providing, at step 15, a model 100 of network features, their parameters and relationships. As mentioned previously, this model 100 is derived from the meta-model designed using UML 101, and the model is then populated at step 104 by an expert 105 or learned from previous experience, for example using machine learning techniques. The method then collects, at step 16, information 19 about network elements or nodes 26, their software packages and connections. The information 19 is typically provided by the nodes 26 over a machine-to-machine interface and whenever the network topology is changed or a new software package is deployed on a node 26, the system typically is notified about that change. Such information 19 could also be provided in an off-line way, entered manually or obtained from the OSS of the network.

The model 100 and information 19 from the nodes 26 is then used at step 17 to automatically build a so-called Feature Compatibility matrix 107, which contains the information about the compatibilities among the elements of the considered existing network.

At step 106, a network operator can ask the system to activate a network feature and the system will access the feature compatibility matrix 107 and assess at step 18 if the requested feature at 106 will introduce any incompatibility into the existing network. This disruption can be caused for example by a missing or incorrect software package or network element. The method used to assess the compatibilities in a new network confirmation is described hereinafter with reference to FIG. 6 of the drawings.

If the assessment at step 18 is successful, the feature can be activated at step 20. Otherwise the system would check at step 21 for a solution to the incompatibility. If a known solution exists, the method requests the required software at step 22 and upgrades the software on the node 26 at step 23. The feature compatibility matrix 107 is then updated with the upgraded feature. The system is informed about every change in the network configuration (e.g. a new software package or network element) and if there are any features waiting for activation, it will check compatibilities and eventually activate the features.

If no known solution exists, the method provides a list of incompatibilities at step 25.

Figure 5:
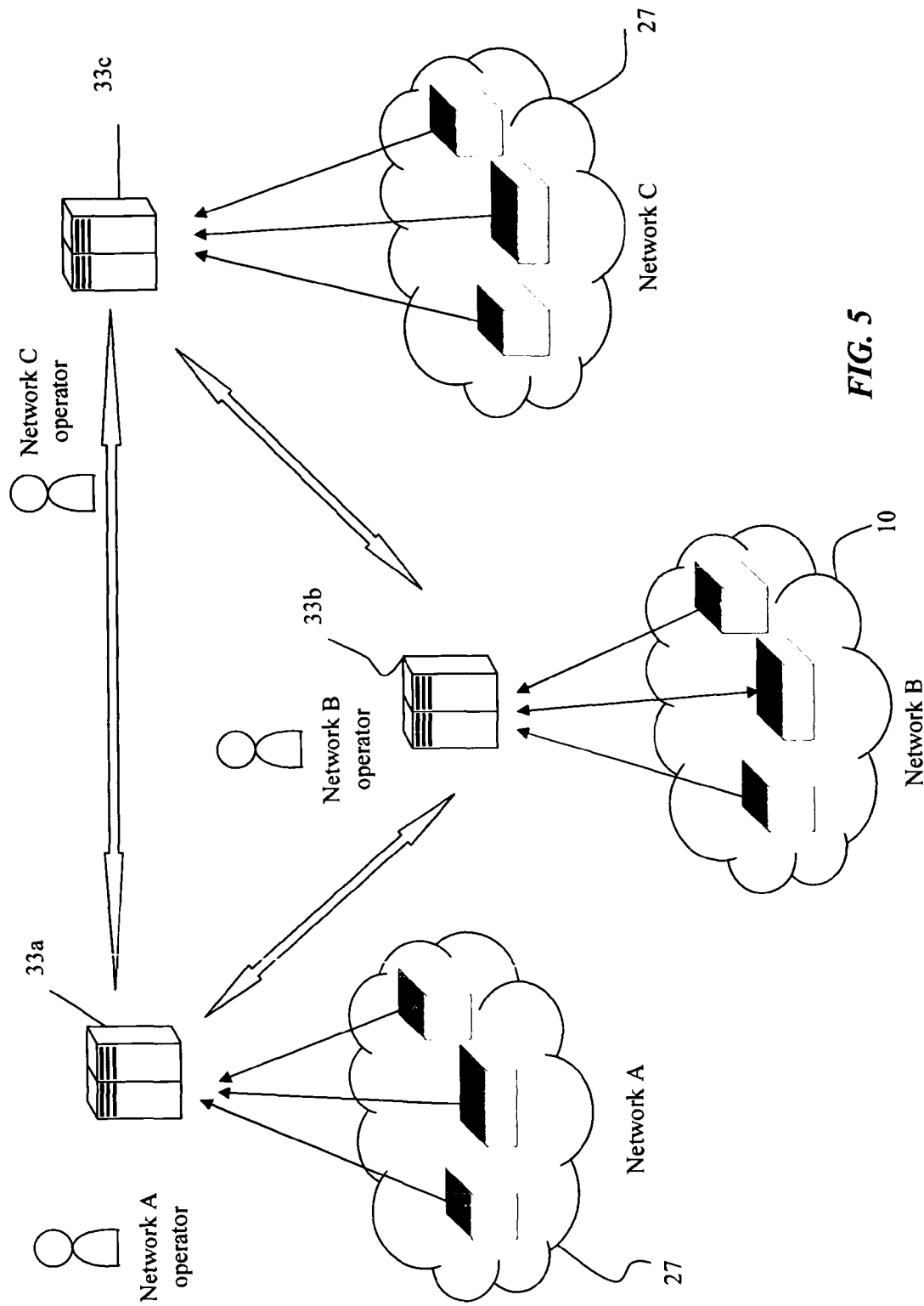
FIG. 5 is a schematic diagram of showing the application of the invention to multiple domains.

Referring to FIG. 5 of the drawings, the system hereinbefore described can be expanded to provide compatibility assessment of features deployed over multiple network domains 10,27 e.g. Network A, Network B and Network C. Every network domain 10,27 has its own system 33 as hereinbefore described to assess feature compatibility of local network features or to support assessment of features compatibility deployed over multiple networks.

If a network feature is deployed in multiple-domains, its compatibility is assessed by a master system 33b on Network B, which interacts with the domain systems (slaves) 33a, 33c on Networks A and C. For each individual feature, the master network can be selected automatically or it can be associated with the domain containing core components of the feature.

When a network operator decides to activate a new multiple-domain feature the master system 33b has to set up connection to the slave compatibility assessment systems 33a, 33c and collect the information 19 about nodes 26 required for the feature and belonging to external network domain Network A, Network C. This operation is performed in step 18 in FIG. 4. If the assessment is successful, the master 33b contacts the slave systems 33a, 33c and enables the activation of features on the assessed nodes (step 20 in FIG. 4). Otherwise the master 33b checks the solution of incompatibilities and if the solution is known it sends a request for new software packages. If necessary, it also contacts slave systems 33a, 33c and provides the list of software packages that should be installed on the nodes from the corresponding network domain (step 22 in FIG. 4).

When the required software package(s) are installed the master system 33b gets notified (step 7) by the network elements from its local network domain. Similarly, when a network element from an external network domain is upgraded, it notifies its local compatibility assessment system. Then if the upgrade was requested by an external assessment system (master) the notification is forwarded to the requesting system (step 23 in FIG. 4).

Figure 6:
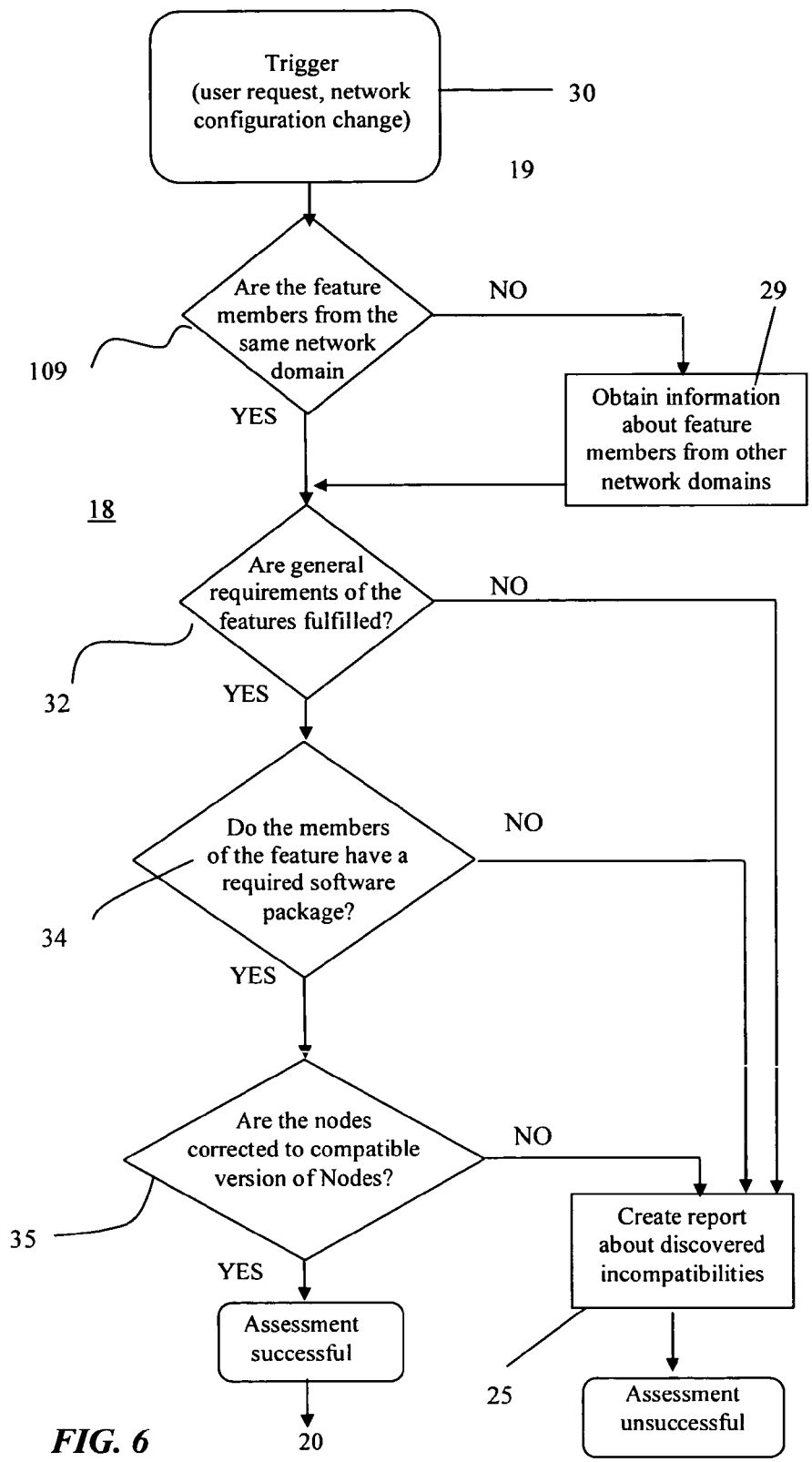
FIG. 6 is a flow diagram illustrating one of the steps of the method of the present invention in further detail.

Referring to FIG. 6 of the drawings, there is shown a depiction of the detailed operation of the method step used to assess the feature compatibilities, which step corresponds to the "check feature compatibility" of step 18 in FIG. 4. The step is provided with the model 100 of the features and the information 19 about network components. The aim of the method is to verify if all the modelled dependencies and requirements for the features are fulfilled in the considered network.

The step 18 is triggered by the network operator who wants to assess compatibilities of the network features. Also, as mentioned previously, the step can be automatically activated after a change in the network configuration in order to assess the compatibilities of a new architecture.

Initially the method step checks at step 109 if there are any features that have members from different network domains. In such a case, the method collects information about the configuration of these external network elements at step 29. Once the method has an updated information about the local and external network nodes, it can assess the compatibility of deployed features.

Firstly, the method checks generic requirements for the features at step 32. Such requirements may be requirements about mandatory nodes in the feature or software packages required to activate the feature (e.g. SGSN In Pool feature requires that SGSN nodes are members of that feature).

Secondly at step 34, the method checks if the members of the feature have the required version of the software package in order to support the proposed feature locally, since the software package has to be compatible with the version of the considered feature.

Thirdly, the process checks at step 35 if every node is connected to a compatible version of nodes. If any of these assessments is unsuccessful, the system generates the report at step 25, the report including a description of incompatibilities and potential changes to solve the incompatibilities. Otherwise, the system approves the changes in the network and activates the features at step 20.

A potential implementation of the method could be based on the UML model 101 where the required compatibilities 102 are represented in OCL. In this case, the model 100 represents generic dependencies between network elements 12, software packages 13 and software features 14. Dependencies and compatibilities for specific versions of features are described with OCL.

Figure 7:
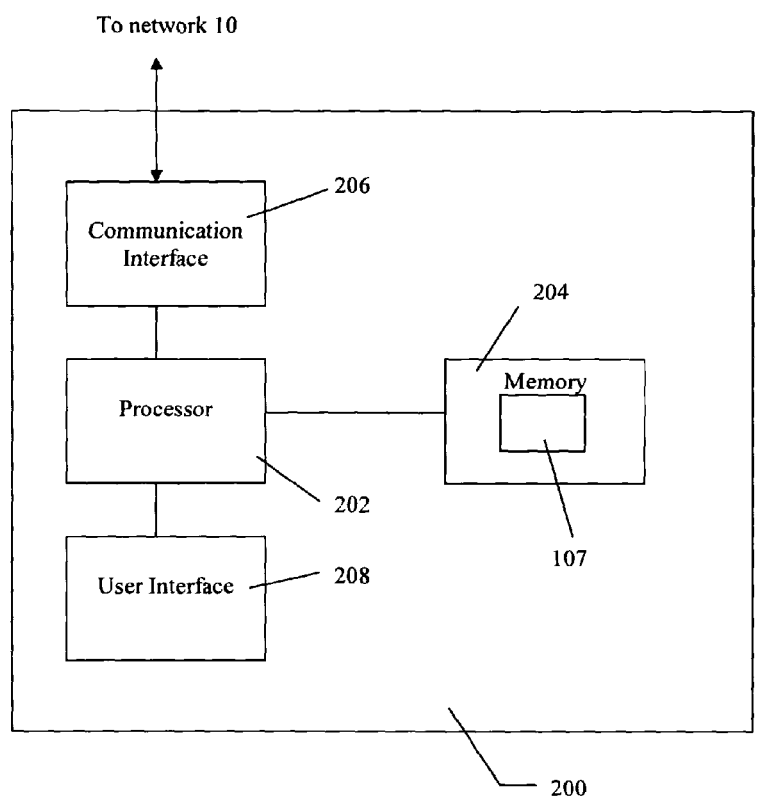
FIG. 7 is a schematic diagram of an apparatus of the present invention.

Referring to FIG. 7 of the drawings, the method of the present invention can be implemented in an apparatus 200 to support the feature compatibility assessment process. This apparatus 200 comprises a processor 202 connected to a memory 204 and to a user interface 208 and a communication interface 206. The apparatus 200 can be used to support both phases of the process. In the first step, the apparatus 200 can be used to model network features in UML and their constraints and rules in OCL. Then the apparatus 200 can then automatically generate a code (e.g. Java classes). This code includes a representation of the UML model 101 in Java, an application to graphically generate an instance of the model, and a validation engine that is responsible for the application of the predefined OCL rules to the instantiation of the model.

The generated code is an automatically generated application that is executed by a user in order to hold a model 100 of the features in a network and to check their compatibility before an upgrade or a deployment of a new feature. In order to achieve this, the user first creates, using the apparatus 200, an instantiation 100 of the UML model 101 that corresponds to the representation of the network for which the compatibility is to be assessed. Once the instantiation is complete, a user can validate software features using the rules defined in OCL and check if a new or upgraded feature can be activated.

The intermediate process of Java code generation between creation of the UML model and the instantiation thereof is automatic and performed by the apparatus 200. The processor 202 executes the code to carry out the method of the present invention that implements the method as defined in claims 1-24. The memory 204 stores the compatibility matrix 107, the meta-model 100 and the software and data used by the processor 204. The communication interface 206 is arranged for communication with the rest of the network, such as nodes 26.

The apparatus 200 can be a unit connected to the network or it can be a card in some other device on the network. Alternatively, the invention can be a software implemented feature within existing OSS.

The present invention provides the following advantages:
a) it reduces the OPEX of running a network because it reduces effort and risk of error during the planning and upgrade of networks;
b) it provides a tool that users can use to find potential solutions for feature incompatibilities;
c) it enables multiple network domain assessment of software feature compatibility;
d) it facilitates the network operator in increasing its revenue because it provides the operator with a list of revenue generating features that can be deployed on its network by merely deploying software e) it provides a meta-model and a method to describe feature constraints with a standard language (OCL) that users can use to find potential solutions for feature incompatibilities

The invention claimed is:

1. A method of assessing the compatibility of a selected feature in a network element or elements with the network features of an existing telecommunications network, the method comprising:
   a) providing, by at least one processor, a model of the network features defining the relationships between the network features, network elements, software elements and software features required for each network feature;
   b) collecting, by the at least one processor, information about said existing telecommunications network to identify the deployment of the feature in the existing network;
   c) building, by the at least one processor, a feature compatibility matrix from said model using said information collected from the existing telecommunications network, said matrix defining the compatibility of network features in said existing telecommunications network;
   d) interrogating, by the at least one processor, the matrix with information defining the parameters of the selected feature; and
   e) determining, by the at least one processor, from said matrix whether said selected feature is compatible with features of the existing network.

2. A method as claimed in claim 1, wherein determining whether said selected feature is compatible with the features of the existing network comprises determining that the selected feature is compatible with the features of the existing network, and the method further comprises activating said selected feature on said existing telecommunications network.

3. A method as claimed in claim 1, wherein determining whether said selected feature is compatible with the features of the existing network comprises determining that the selected feature is incompatible with the features of the existing network, and the method further comprises determining whether a solution can be created.

4. A method as claimed in claim 3, wherein determining whether the solution can be created comprises determining that the solution can be created, and the method further comprises creating said solution.

5. A method as claimed in claim 3, wherein determining whether the solution can be created comprises determining that the solution can be created, and the method further comprises requesting a software code to create said solution.

6. A method as claimed in claim 5, comprising revising said feature compatibility matrix with said generated software.

7. A method as claimed in claim 6, comprising further determining whether said selected feature is compatible with the revised features in the matrix.

8. A method as claimed in claim 3, wherein determining whether said selected feature is compatible with the features of the existing network comprises determining that the selected feature is incompatible with the features of the existing network, and the method further comprises creating a list of the or each incompatibility.

9. A method as claimed in claim 1, in which said collecting step comprises collecting information from operations support system software OSS on the network.

10. A method as claimed in claim 1, in which said collecting step comprises collecting information about a plurality of existing telecommunications networks to identify the deployment of the features in the respective existing network.

11. A method as claimed in claim 1, wherein determining whether said selected feature is compatible with features of the existing network comprises:

determining that said selected feature is not compatible when all network elements are connected to compatible elements for the selected feature; and determining that said selected feature is compatible when all network elements are connected to compatible elements for the selected feature.

12. A method as claimed in claim 1, in which said determining step checks for other requirements of the feature and for the presence of the required software packages.

13. An apparatus for assessing the compatibility of a selected network feature with the network features of an existing telecommunications network, the apparatus comprising:

a. a memory containing a feature compatibility matrix created from a model of each network feature and information from said existing telecommunications network to identify the deployment of the features in the existing network, the model defining the relationships between any network elements, software elements and software features required for the network feature;

b. an input for receiving information defining the parameters of the selected feature; and c. a processor for interrogating the matrix with said information defining the parameters of the selected feature and for determining from said matrix whether said selected feature is compatible with features of the existing network.

14. An apparatus as claimed in claim 13, in which said processor generates an instantiation of each network feature and builds said feature compatibility matrix using said model of each network feature and said information from said existing telecommunications network.

15. An apparatus as claimed in claim 13, in which said processor is arranged to execute a software code to interrogate the matrix.

16. An apparatus as claimed in claim 13, in which the processor is arranged to generate an instantiation of each network feature and to build a revised feature compatibility matrix whenever it is detected that a network feature is updated or varied.

17. An apparatus as claimed in claim 13, in which said information identifying the deployment of the features in the existing network is provided from operations support system software OSS on the existing network.

18. An apparatus as claimed in claim 13, further comprising a communication interface, said information identifying the deployment of the features in the existing network being provided from elements of the network via said interface.

* * * * *

UNITED STATES PATENT AND TRADEMARK OFFICE
CERTIFICATE OF CORRECTION

| | | |
|---|---|---|
| PATENT NO. | : 8,886,186 B2 | Page 1 of 1 |
| APPLICATION NO. | : 13/574700 | |
| DATED | : November 11, 2014 | |
| INVENTOR(S) | : Fedor et al. | |

It is certified that error appears in the above-identified patent and that said Letters Patent is hereby corrected as shown below:

In the Specification

In Column 1, Line 39, delete "are" and insert -- is --, therefor.

In Column 3, Line 37, delete "apply" and insert -- applies --, therefor.

In Column 5, Lines 39-40, delete "SoftwareElements 14" and
insert -- SoftwareElements 13 --, therefor.

In Column 9, Line 49, delete "processor 204." and insert -- processor 202. --, therefor.

In Column 9, Line 67, delete "software" and insert -- software; --, therefor.

In Column 10, Line 4, delete "incompatibilities" and insert -- incompatibilities. --, therefor.

Signed and Sealed this
Fourth Day of August, 2015

Michelle K. Lee
*Director of the United States Patent and Trademark Office*